(12) United States Patent
Asakawa

(10) Patent No.: US 12,742,915 B2
(45) Date of Patent: Sep. 22, 2026

(54) BLADE DRIVING DEVICE, CAMERA DEVICE AND ELECTRONIC APPARATUS

(71) Applicant: NEW SHICOH MOTOR CO., LTD, Zhejiang (CN)

(72) Inventor: Shinroku Asakawa, Kanagawa (JP)

(73) Assignee: NEW SHICOH MOTOR CO., LTD, Zhejiang (CN)

( * ) Notice: Subject to any disclaimer, the term of this patent is extended or adjusted under 35 U.S.C. 154(b) by 194 days.

(21) Appl. No.: 18/826,797

(22) Filed: Sep. 6, 2024

(65) Prior Publication Data

US 2025/0076548 A1 Mar. 6, 2025

(30) Foreign Application Priority Data

Sep. 6, 2023 (CN) ........................ 202311149461.0

(51) Int. Cl.
*G02B 5/00* (2006.01)

(52) U.S. Cl.
CPC .................................. *G02B 5/005* (2013.01)

(58) Field of Classification Search
CPC ..................................................... G02B 5/005
USPC ......................................................... 359/234
See application file for complete search history.

(56) References Cited

U.S. PATENT DOCUMENTS

2006/0033821 A1* 2/2006 Naganuma ............... G03B 9/22 348/221.1
2012/0287516 A1* 11/2012 Nakajima ................ G03B 9/06 359/738
2014/0212123 A1* 7/2014 Sato ......................... G03B 9/06 396/510
2019/0346657 A1* 11/2019 Hayashi ................. G02B 7/023
2020/0026149 A1* 1/2020 Jun .......................... G03B 9/06

FOREIGN PATENT DOCUMENTS

CN 115480433 A 12/2022

* cited by examiner

*Primary Examiner* — Sharrief I Broome
(74) *Attorney, Agent, or Firm* — Hayes Soloway PC

(57) ABSTRACT

A blade driving device has a first member with a plurality of adjustment pins provided on a circumference centered on an optical axis of a lens body. The blade driving device includes a second member with shaft pins corresponding to the adjustment pins and a plurality of blades. Each blade has an adjustment hole movably fitting the respective adjustment pin and a shaft hole in which the shaft pin is rotatably fixed. The blades combine to form a light passing hole in the center, through which light incident on the lens body passes. The first member and the second member are combined so that one member rotates relative to the other member with rotation centered on the optical axis of the lens body. The other member has a mechanical stopper that stops the rotation of the one member.

10 Claims, 11 Drawing Sheets

BLADE DRIVING DEVICE, CAMERA DEVICE AND ELECTRONIC APPARATUS

CROSS-REFERENCE TO RELATED APPLICATIONS

This application claims the benefit of Chinese Patent Application No. 202311149461.0 filed Sep. 6, 2023, which is hereby incorporated by reference herein in its entirety.

TECHNICAL FIELD

The present disclosure relates to a blade driving device suitable for electronic apparatus such as smartphones, a camera device including the blade driving device, and an electronic apparatus.

BACKGROUND

Various techniques have been proposed to adjust the amount of light incident on the lens body by sliding the blades of the camera device. The adjustable diaphragm disclosed in Chinese patent publication No. 115480433 has a fixed stand and a rotary stand arranged to surround a lens. A plurality of blades each formed with a guide hole are arranged on a circumference of the fixed stand and are turnably supported. In addition, guide pillars inserted into the respective guide holes are disposed in the rotary stand. In this adjustable diaphragm, the rotary stand rotates relative to the fixed stand, so that the guide pillar moves in the guide hole and the blade is turned. Thus, the diameter of the light passing hole formed by being surrounded by the plurality of blades is adjusted.

SUMMARY

In the above-described configuration, when the position where the light passing hole has the minimum diameter is determined by the position of the mechanical stopper that restricts the movement of the guide pillar, there is a problem that variation in the position of the mechanical stopper within the range of the component tolerance, caused variation in the minimum diameter of the light passing hole. The variation in the diameter of the light passing hole directly lead to the variation in the amount of light incident on the lens, and the influence of the variation in the diameter of the light passing hole is greater when the diameter of the light passing hole is small than when the diameter is large.

The present disclosure has been made in view of such problem, and the present invention aims to provide a blade driving device, a camera device and an electronic apparatus. The blade driving device, a camera device and an electronic apparatus can suppress variation in the minimum diameter of the light passing hole formed by blades even if there is variation in the position of the mechanical stopper.

In accordance with a first aspect of the present disclosure, there is provided a blade driving device, including: a first member having a plurality of adjustment pins provided on a circumference centered on an optical axis of a lens body; a second member having shaft pins provided in correspondence with the adjustment pins; and a plurality of blades each having an adjustment hole in which the adjustment pin is movably fitted and a shaft hole in which the shaft pin is fitted not to be able to move, and being turnable around the shaft pin, and being combined to form a light passing hole the center thereof through which light incident on the lens body passes, wherein the first member and the second member are combined with each other so that one rotates relative to the other centered on the optical axis of the lens body, and the other has a mechanical stopper that stops the rotation of the one by making the one touch on the other, the adjustment hole has a first section extending from a first position and a second section extending from a second position, when the adjustment pin is in the second section, the adjustment hole of the second section extends along a motion trajectory line where the adjustment pin moves, a diameter of the light passing hole is minimum, and at this time, the first member and the second member touch on each other at the mechanical stopper.

In accordance with a second aspect of the present disclosure, there is provided a camera device including the blade driving device described above.

In accordance with a third aspect of the present disclosure, there is provided an electronic apparatus including the camera device described above.

Further features of the present invention will become apparent from the following description of exemplary embodiments (with reference to the attached drawings).

DETAILED DESCRIPTION OF DRAWINGS

Figure 1:
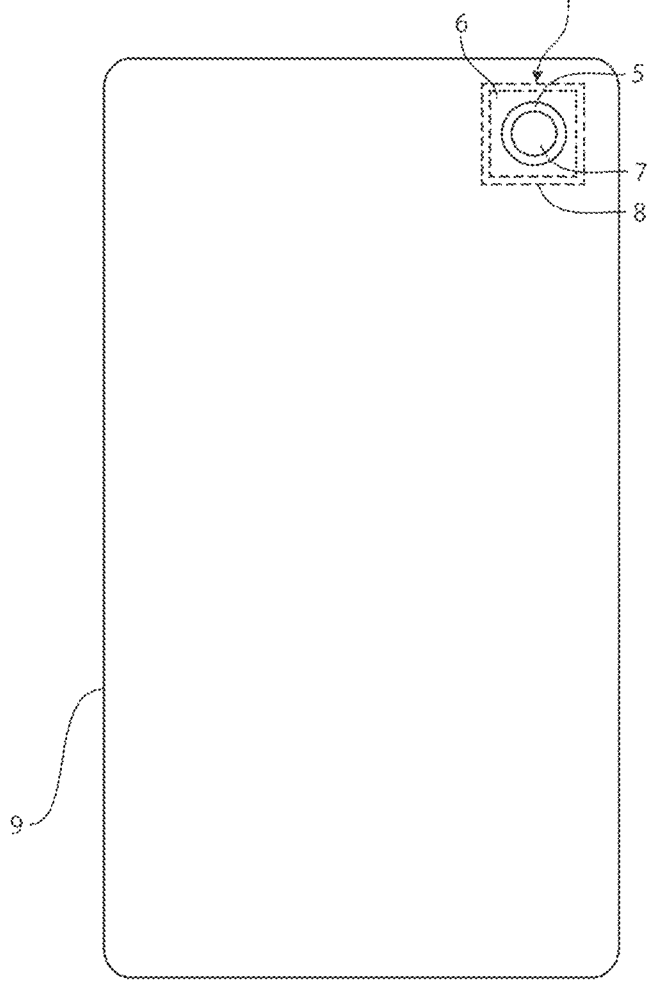
FIG. 1 is a front view of a smartphone 9 on which a camera device 1 is mounted, the camera device 1 including a blade driving device 5 according to an embodiment of the present disclosure.

Hereinafter, embodiments of the present disclosure are explained with reference to drawings. As shown in FIG. 1, a camera device 1 according to one embodiment of the present disclosure is accommodated in a smartphone 9, which is an electronic apparatus.

Figure 2:
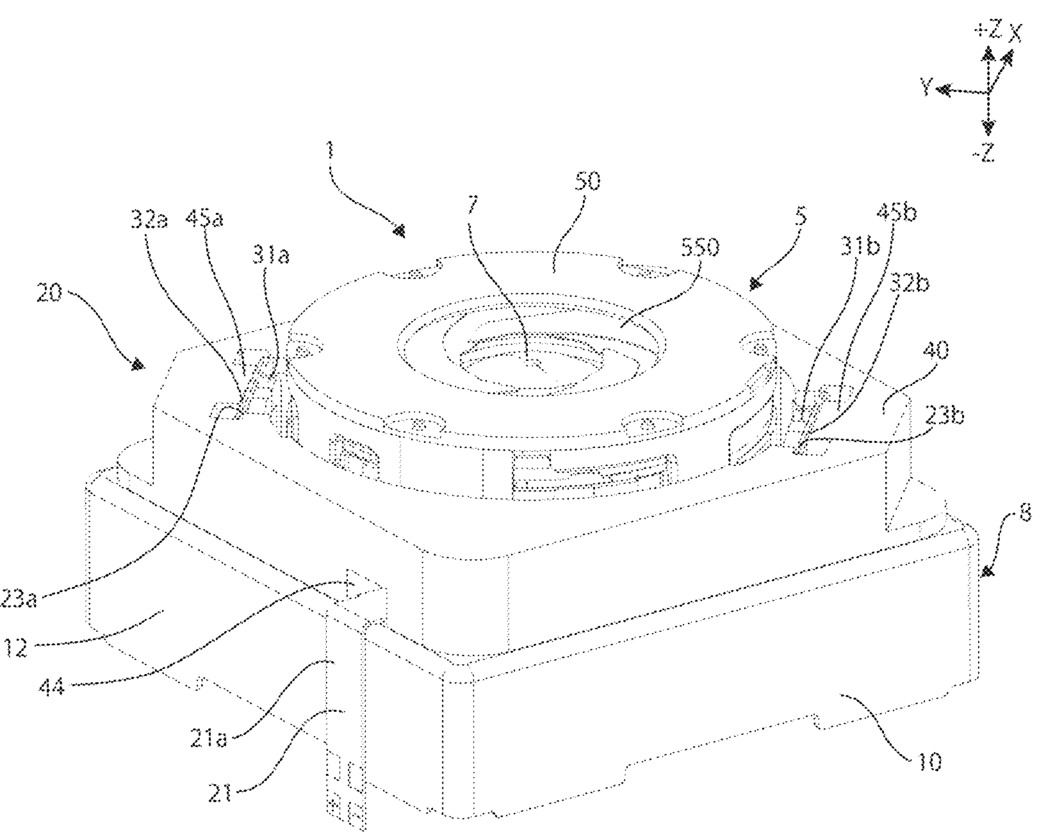
FIG. 2 is a perspective view of the camera device 1 shown in FIG. 1.
Figure 3:
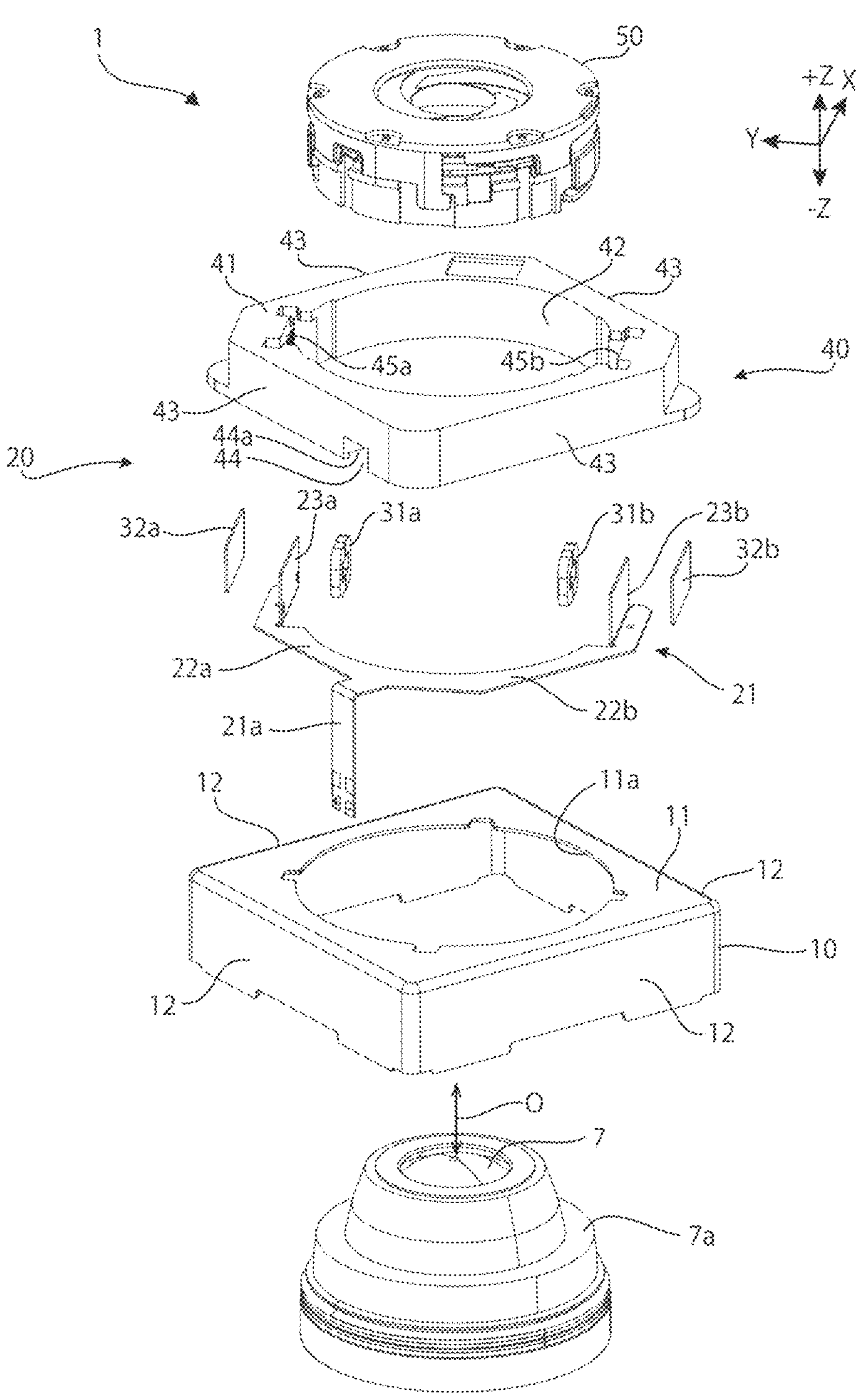
FIG. 3 is an exploded perspective view of the camera device 1 shown in FIG. 2.

As shown in FIG. 1, FIG. 2 and FIG. 3, the camera device 1 has a lens body 7, a lens driving device 8, a blade driving device 5 and an image sensor 6. In FIG. 2 and FIG. 3, only a housing 10 for the lens driving device 8 is shown. The blade driving device 5 has a blade driving device main body 50 and a peripheral portion 20. Further, as described later, the blade driving device 5 has a plurality of structural members comprising a first member to a fourth member. The blade driving device main body 50 is adhered and fixed to a placing portion 7*a* provided on the lens body 7, moves together with the lens body 7, and has a positional relationship with the lens body 7 unchanged. The peripheral portion 20 is attached to the housing 10.

Hereinafter, as shown in FIG. 2, FIG. 3, FIG. 4, FIG. 6, a direction of the optical axis O of the lens body 7, which is also a direction in which light from a subject is incident, is set as a Z direction, a direction orthogonal to the Z direction is appropriately set as an X direction, and a direction orthogonal to both the Z direction and the X direction is appropriately set as a Y direction. Further, the +Z side of the optical axis O of the lens body 7, which is the side of the subject, may be referred to as a front side, and the −Z side, which is the side on which the image sensor 6 on the opposite side of the subject is provided, may be referred to as a rear side.

The housing 10 of the lens driving device 8 has a rectangular parallelepiped shape with an open rear side and has a rectangular front wall 11 parallel to an XY plane and four sidewalls 12 extending from four sides of the front wall 11 to the rear side. A circular through hole 11*a* for passing light from a subject is formed in the front wall 11. The lens body 7 is accommodated in the housing 10.

The peripheral portion 20 of the blade driving device 5 is a fourth member and has a frame body 40 attached to a front side surface of the front wall 11 of the housing 10, an FPC (Flexible printed circuit) 21 attached to the frame body 40, coils 31*a* and 31*b*, and reinforcing plates 32*a* and 32*b*.

As shown in FIG. 3, the frame body 40 has an approximately quadrangular front side surface 41, an approximately cylindrical inner side surface 42 penetrating through the front side surface 41 and extending to the rear side, and an outer side surface 43 extending to the rear side from the outer periphery of the front side surface 41. Coil holders 45*a* and 45*b* are formed on the inner side surface 42 corresponding to predetermined opposite corners of the quadrangular shape. A notched portion 44 for inserting a terminal portion 21*a* of the FPC 21 is formed at the rear end of the outer side surface 43 near the corner portion where the coil holders 45*a* and 45*b* are not formed, as shown in FIG. 2. Further, a groove 44*a*, to which extension portions 22*a* and 22*b* of the FPC 21 is attached, is provided on the rear side surface of the frame body 40 following the notched portion 44.

The FPC 21 has the terminal portion 21*a* connected to the outside of the blade driving device 5, extension portions 22*a* and 22*b* bifurcated and respectively extending from the terminal portion 21*a*, and erecting portions 23*a* and 23*b* respectively provided at tip ends of the extension portions 22*a* and 22*b*. The terminal portion 21*a* is arranged along the outer side of the sidewall 12 of the housing 10 and is inserted into the frame body 40 from the notched portion 44. The extension portions 22*a* and 22*b* are accommodated in the groove 44*a* to reach the coil holders 45*a* and 45*b*. The erecting portions 23*a* and 23*b* rise from the extension portions 22*a* and 22*b* toward the front side, respectively, and are fixed to the coil holders 45*a* and 45*b* via the reinforcing plates 32*a* and 32*b*, respectively. The coils 31*a* and 31*b* are fixed and electrically connected to surfaces facing inward of the erecting portions 23*a* and 23*b*, respectively. Thereby, the coils 31*a* and 31*b* are supplied with power from the outside via the FPC 21.

Figure 4:
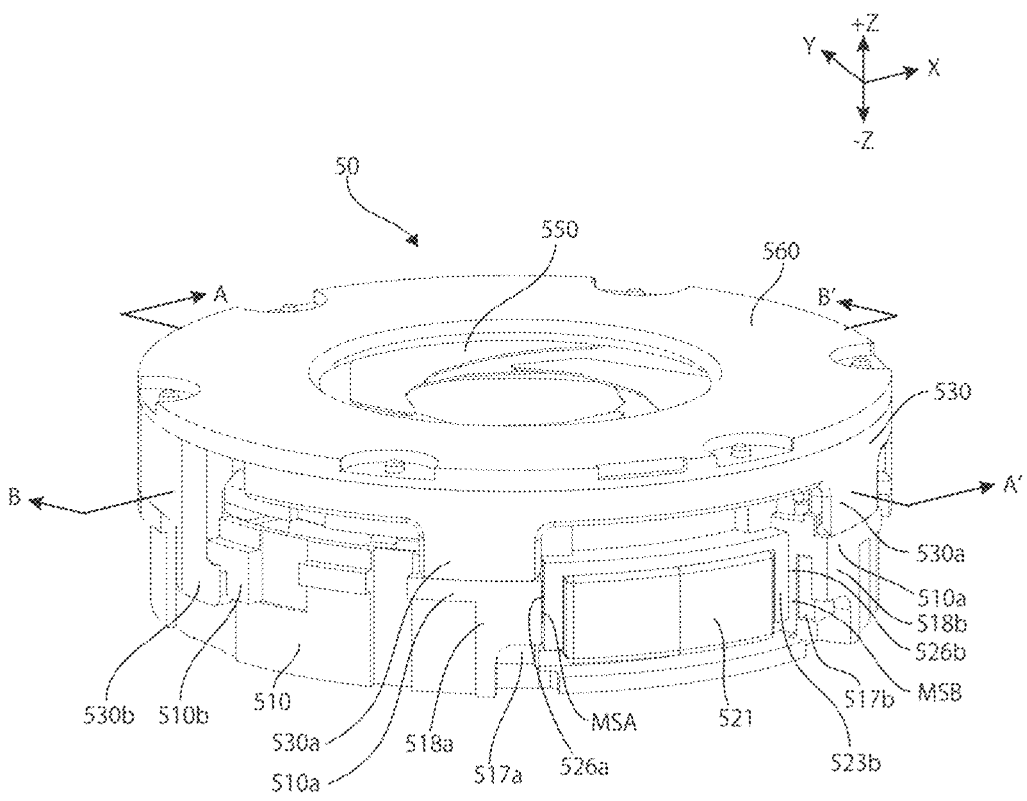
FIG. 4 is a perspective view of the of the blade driving device main body 50 shown in FIG. 2, as viewed from a direction in which a mechanical stopper MSA is a front.
Figure 5:
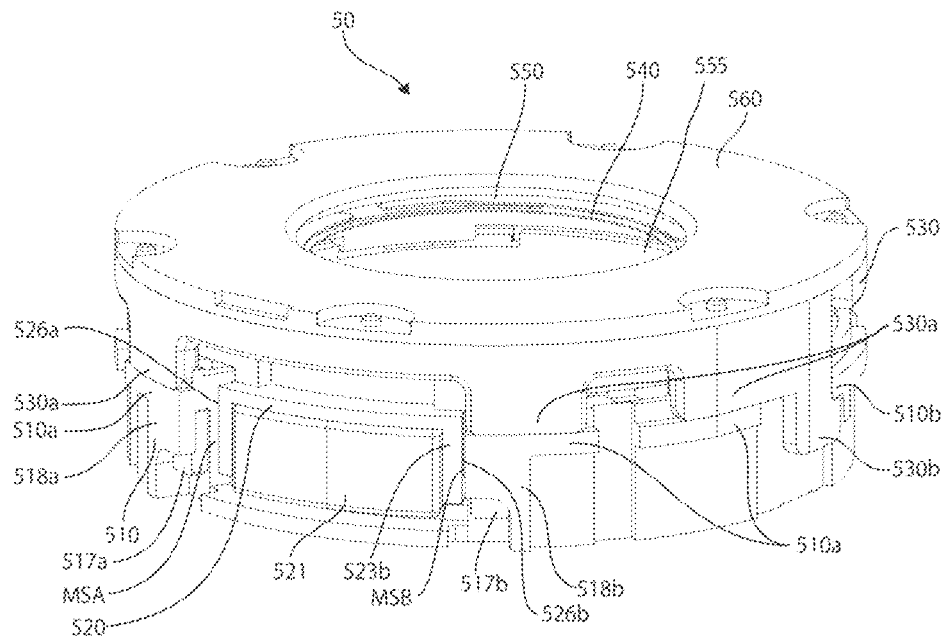
FIG. 5 is a perspective view of the of the blade driving device main body 50 as viewed from a direction in which a mechanical stopper MSB is a front.
Figure 6:
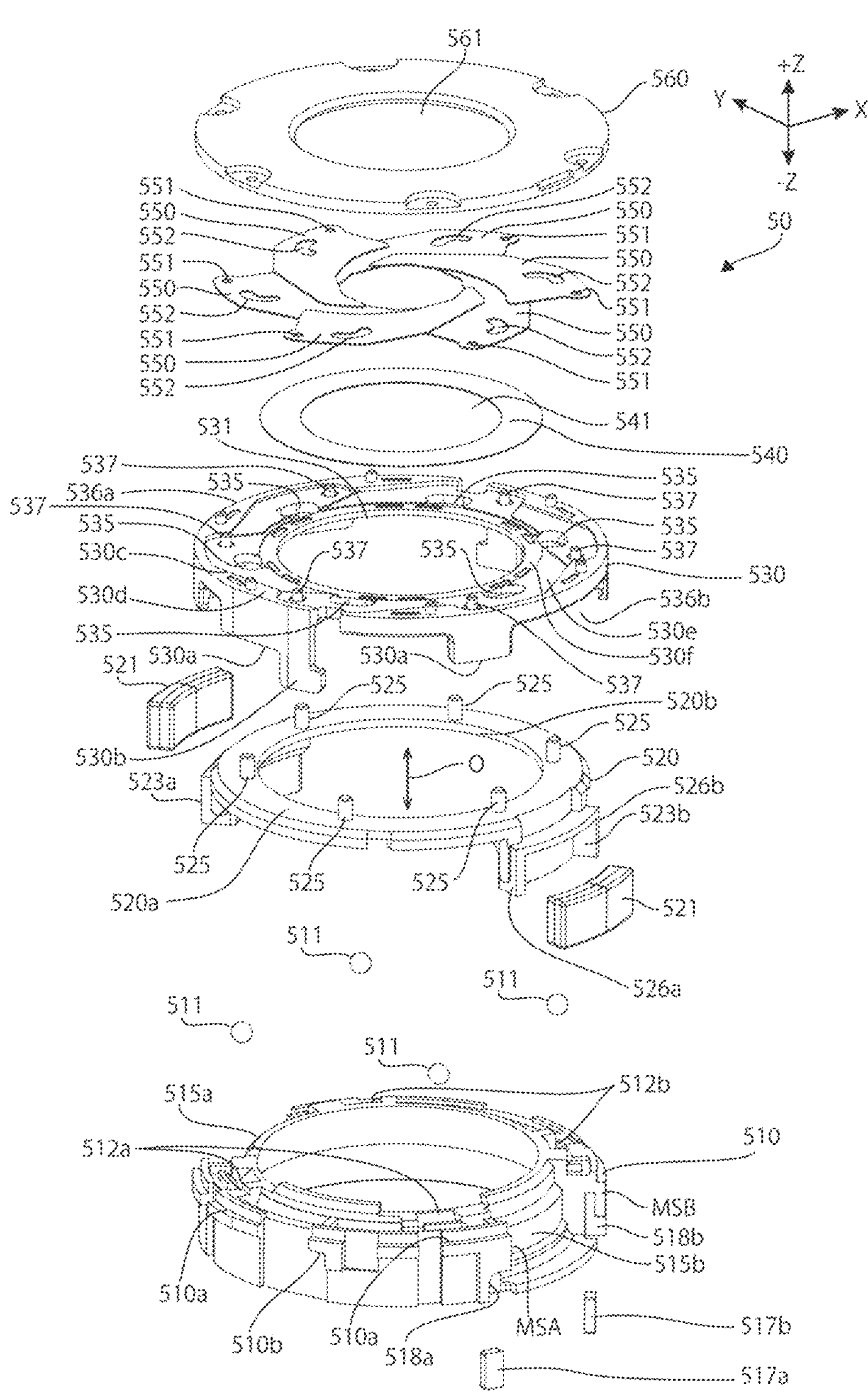
FIG. 6 is an exploded perspective view of the blade driving device main body 50.

As shown in FIG. 4, FIG. 5 and FIG. 6, the blade driving device main body 50 has a base 510, four balls 511, magnetic pieces 517*a* and 517*b*, a movable ring 520, two magnets 521, a fixed ring 530, an opening plate 540, six blades or six diaphragm blades 550, and a cover 560. The first member corresponds to the movable ring 520, the second member corresponds to a combination of the base 510 and the fixed ring 530, and the third member corresponds to the opening plate 540.

Figure 7:
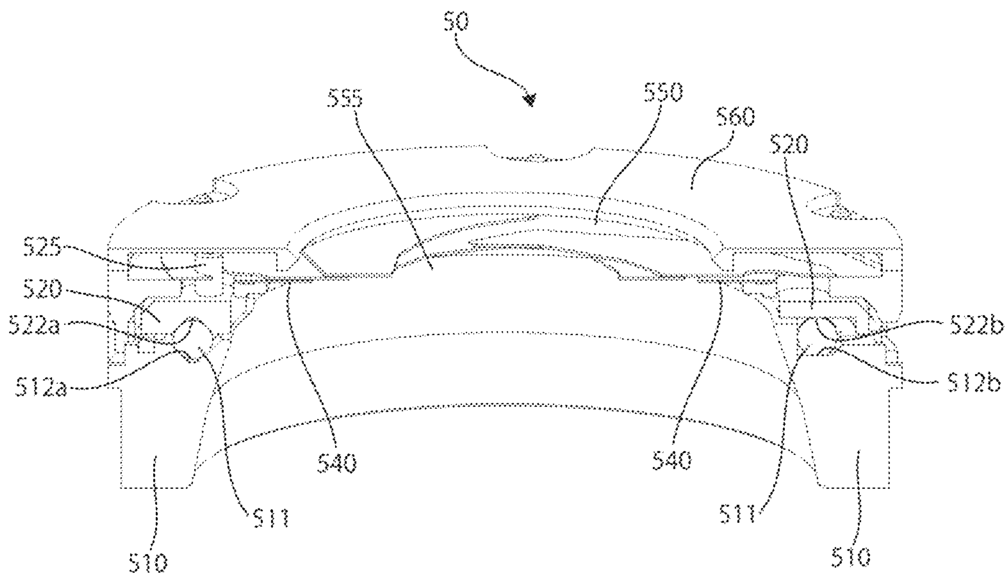
FIG. 7 is a cross-sectional view taking along the A-A' line in FIG. 4.

The base 510 has a rear surface fixed to the placing portion 7*a* of the lens body 7 and has an annular shape close to a cylindrical shape centered on the optical axis O. A plurality of base touching portions 510*a* are provided along the circumference on the outermost periphery of the front side surface of the cylindrical shape, and inverted L-shaped base hook portions 510*b* are provided at two locations of the side surface of the cylindrical shape. In addition, two ball receiving portions 512*a* are provided at positions close to the inner periphery of the front side surface of the cylindrical shape at an interval of 90 degrees along the circumference. In addition, two ball receiving portions 512*b* are provided at positions opposite to the two ball receiving portions 512*a* in circumferential direction at an interval of 90 degrees. As shown in FIG. 7, the ball receiving portion 512*a* is a V-shaped groove recessed to the rear side, and the ball receiving portion 512*b* is a U-shaped groove having a flat bottom recessed to the rear side.

Further, as shown in FIG. 6, two holder accommodating portions 515*a* and 515*b* are provided so as to gouge out two outer portions positioned opposite to each other in the circumferential direction of the cylindrical shape, which are positions between the two ball receiving portions 512*a* and the two ball receiving portions 512*b*. The holder accommodating portions 515*a* and 515*b* have a fan shape centered on the optical axis O in a schematic cross-sectional shape as viewed from the front side. In one holder accommodating portion 515*b* which is a sectional fan-shaped recess, mechanical stoppers MSA and MSB whose end surfaces on both sides in the circumferential direction restrict rotation of the movable ring 520 are formed. There is no mechanical stopper formed at the holder accommodating portion 515*a* on the opposite side. Pocket-shaped magnetic piece holders 518*a* and 518*b* are provided adjacent to the mechanical stoppers MSA and MSB. Magnetic pieces 517*a* and 517*b* as magnetic members formed of magnetic materials such as iron are housed and fixed in the magnetic piece holders 518*a* and 518*b*.

The fixed ring 530 has a disk portion 530*c* having an annular shape centered on the optical axis O of the lens body 7 and having a through hole 531 in the center, a plurality of fixed ring touching portions 530*a* extending from the side edge portion of the disk portion 530*c* to the rear side, and two fixed ring hook portions 530*b* extending from the side edge portion of the disk portion 530*c* to the rear side in an L shape (refer to FIGS. 4 and 5). The fixed ring 530 is constituted integrally with the base 510 on the front side of the base 510 by combining the fixed ring hook portion 530*b* with the base hook portion 510*b* and touching and fixing the fixed ring touching portion 530*a* to the base touching portion 510*a*. Further, accommodating recessed portions 536*a* and 536*b* of the fixed ring 530 are provided at positions corresponding the holder accommodating portions 515*a* and 515*b* of the base 510.

The front surface of the disk portion 530*c* has three portions, namely, an outermost peripheral portion 530*d*, a central portion 530*e* and an innermost peripheral portion 530*f*. The outermost peripheral portion 530*d* is located at the highest position (front side), and the cover 560 is attached thereto. The innermost peripheral portion 530*f* is located at the lowest position (rear side), and the opening plate 540 is attached thereto. The central portion 530*e* is located at an intermediate height, and six blades 550 are attached thereto. The central portion 530*e* further has a slight difference in height depending on the attachment height of each blade 550.

Six slots 535 extending in the peripheral direction through the disk portion 530*c* in the front-rear direction are provided at equal intervals in the peripheral direction on the innermost periphery side of the central portion 530*e*. Further, six shaft pins 537 protruding forward are erected at equal intervals in the peripheral direction near the center in the radial direction of the central portion 530*e*.

The movable ring 520 has a disk portion 520*a* having an annular shape centered on the optical axis O of the lens body 7 and having a through hole 520*b*, and two magnet holders 523*a* and 523*b* extending from the outer peripheral edge portion of the disk portion 520*a* to the rear side. The movable ring 520 is arranged between the base 510 and the fixed ring 530.

The magnet holder 523*a* is accommodated in an accommodating space formed by the holder accommodating portion 515*a* of the base 510 and the accommodating recessed portion 536*a* of the fixed ring 530, and the magnet holder 523*b* is accommodated in an accommodating space formed by the holder accommodating portion 515*b* and the accommodating recessed portion 536*b*. The magnets 521 are attached and fixed to the magnet holders 523*a* and 523*b* one by one. The magnets 521 are arranged to face the coils 31*a* and 31*b* (refer to FIG. 3). Each magnet 521 is magnetized in the radial direction, and its polarity is inverted at the center in the circumferential direction. The magnet holders 523*a* and 523*b* are formed to cover the inner periphery side, the front side, and the outer side in the peripheral direction of the magnet 521. Both outer side surfaces of a portion of one magnet holder 523*b* covering the outer side in the peripheral direction of the magnet 521 face the mechanical stoppers MSA and MSB, as shown in FIG. 4, respectively. The touching portions 526*a* and 526*b* are provided on both outer side surfaces, and abut on the mechanical stoppers MSA and MSB, respectively, when the movable ring 520 is rotated.

Figure 8:
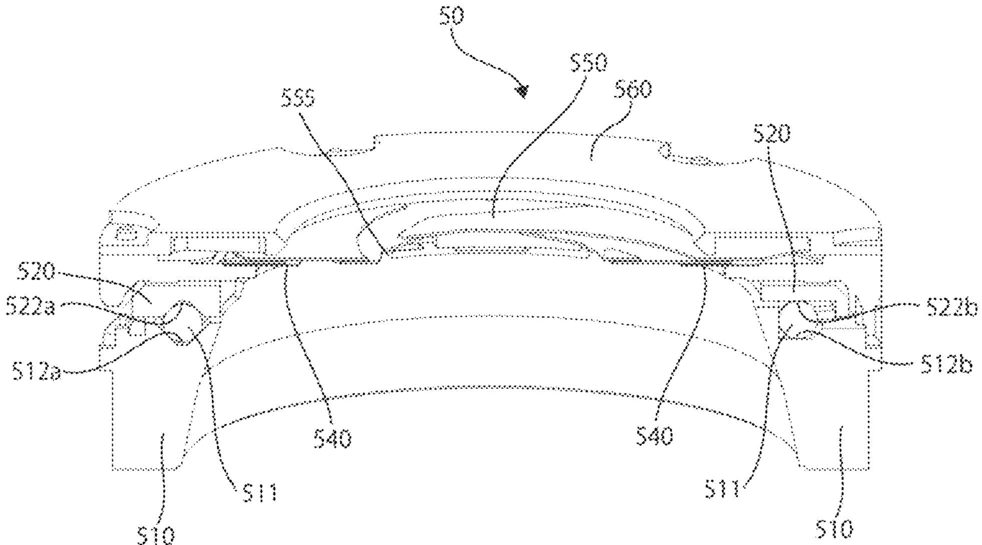
FIG. 8 is a cross-sectional view taking along the B-B' line in FIG. 4.

Ball receiving portions 522*a* and 522*b* are formed on the rear side surface of the disk portion 520*a* of the movable ring 520 as shown in FIG. 7 and FIG. 8. The ball receiving portion 522*a* is provided in correspondence with the ball receiving portion 512*a* of the base 510 and is a V-shaped groove recessed to the front side. The ball receiving portion 522*b* is provided in correspondence with the ball receiving portion 512*b* of the base 510 and is an inverted L-shaped groove recessed to the front side. Each set of the ball receiving portion 512*a* and the ball receiving portion 522*a* and each set of the ball receiving portion 512*b* and the ball receiving portion 522*b* sandwiches one ball 511, respectively. An annular magnetic metal not shown is embedded in the base 510, and this magnetic metal is located on the rear side of the two magnets 521. Thereby, as shown in FIG. 7 and FIG. 8, the movable ring 520 is drawn toward the base 510 side (rear side) and is rotatably supported via the four balls 511.

Six adjustment pins 525 protruding forward are erected at equal intervals in the peripheral direction on the front side surface of the disk portion 520*a* of the movable ring 520. The adjustment pins 525 protrude to the front side of the disk portion 530*c* of the fixed ring 530 through the slots 535 of the fixed ring 530, respectively. When the coils 31*a* and 31*b* are supplied with current, the movable ring 520 is driven to rotate around the optical axis O by the reaction of electromagnetic force generated in the coils 31*a* and 31*b*.

When the movable ring 520 rotates clockwise as viewed from the front side, the rotation of the movable ring 520 is stopped due to the touching portion 526*a* of the magnet holder 523*b* touching on the mechanical stopper MSA as shown in FIG. 4. At this time, since the magnet 521 is pulled by the magnetic piece 517*a*, the movable ring 520 can be kept at a position where the movable ring 520 abuts without returning in the opposite direction after touching. When the movable ring 520 is rotated counterclockwise as viewed from the front side, the rotation of the movable ring 520 is stopped due to the touching portion 526*b* of the magnet holder 523*b* touching on the mechanical stopper MSB as shown in FIG. 5. Similarly, since the magnet 521 is pulled by the magnetic piece 517*b*, the movable ring 520 can be kept in a position in which the movable ring 520 abuts without returning in the opposite direction after touching.

The opening plate 540 is a disk-shaped plate member having a circular through hole 541 centered on the optical axis O, and is attached and fixed to the innermost peripheral portion 530*f* of the disk portion 530*c* of the fixed ring 530. In the present embodiment, maximum diameter of an aperture (i.e. diaphragm) AP that restricts the passage of light incident on the lens body 7 is the diameter of the through hole 541 of the opening plate 540.

Figure 9:
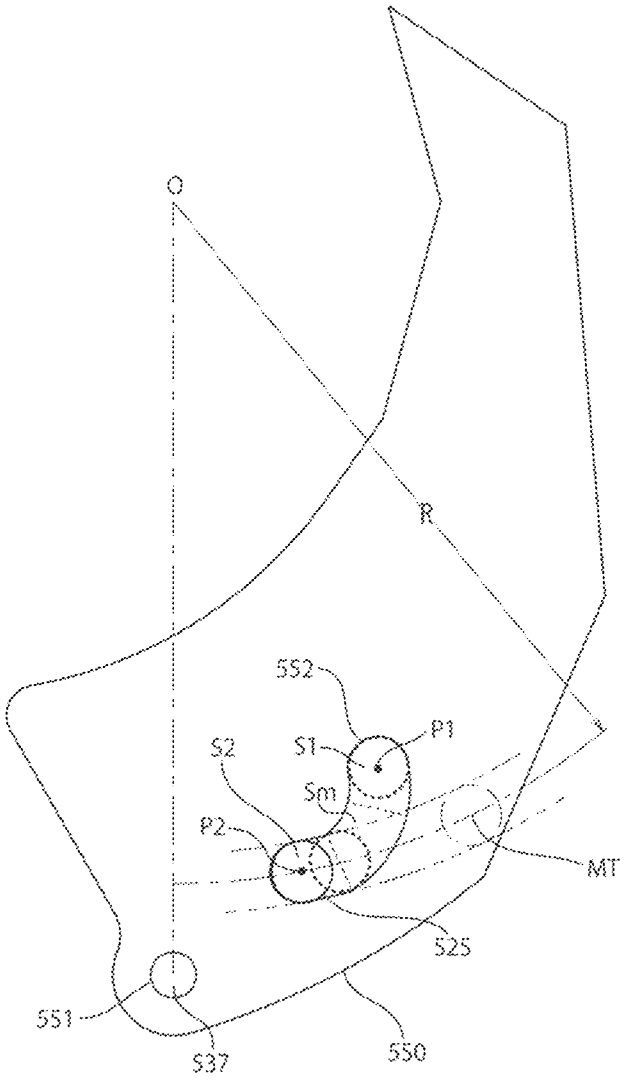
FIG. 9 is a plan view of the blade 550 representing a relationship between a shape of an adjustment hole 552 and an adjustment pin 525.

The six blades 550 are arranged at equal intervals in the peripheral direction at the central portion 530*e* of the disk portion 530*c* of the fixed ring 530, and the six blades are combined to form a light passing hole 555 at the center thereof, through which light incident from the subject to lens body 7 passes. The light passing hole 555 has a substantially circle shape centered on the optical axis O of the lens body 7, and the minimum diameter of the aperture AP is the minimum diameter of the light passing hole 555 formed by the six blades 550. The blade 550 has a shaft hole 551 at one end. The shaft pin 537 of the fixed ring 530 is inserted into the shaft hole 551. The blade 550 is turnably supported centered on the shaft pin 537. As shown in FIG. 9, the blade 550 has a shape such that an elongated acute isosceles triangle arranged along the circumferential direction is curved toward the inner periphery side as it goes to the elongated tip, and the shaft hole 551 is provided at a corner portion on the outer periphery side of this acute isosceles triangle.

Further, as shown in FIG. 9, the six blades 550 are formed with adjustment holes 552 extending from the respective first positions P1 to the second positions P2. The adjustment pin 525 of the movable ring 520 protruding through the slot 535 of the fixed ring 530 is inserted into the adjustment hole 552. When the adjustment pins 525 move in the circumferential direction of a circle centered on the optical axis O in accordance with the rotation of the movable ring 520, the blades 550 turn around the shaft pins 537, and the size of the light passing hole 555 (refer to FIG. 6) formed by the blades 550 changes. The first position P1 is a position on the blade 550 corresponding to a position where the adjustment pin 525 can move to the maximum in a direction in which the diameter of the light passing hole 555 (refer to FIG. 6) formed by the blades 550 increases. The second position P2 is a position on the blade 550 corresponding to a position where the adjustment pin 525 can move to the maximum in a direction in which the diameter of the light passing hole 555 formed by the blades 550 decreases.

The inner edge of the blade 550 faces the optical axis O side, and the inner edge has an arc shape curved to be away from the optical axis O from the tip of the acute isosceles triangle toward the base end. Therefore, the light passing hole 555 surrounded by the inner edges of the blades 550 is nearly circular.

The cover 560 is a disk-shaped member having a circular through hole 561 centered on the optical axis O. The cover 560 is fixed to the outermost peripheral portion 530*d* of the disk portion 530*c* of the fixed ring 530. The blade 550 is arranged sandwiched between the cover 560 and the opening plate 540.

The relationship between the shape of the adjustment hole 552 in the blade 550 and the adjustment pin 525 will be described with reference to FIG. 9. As shown in FIG. 9, the blade 550 has an adjustment hole 552 extending from the first position P1 to the second position P2. FIG. 9 shows a state in which the adjustment pin 525 is located at the second position P2. That is, the diameter of the light passing hole 555 is minimum. The adjustment pin 525 of the movable ring 520 is inserted into the adjustment hole 552 and rotatably moves to the right side of the drawing along the motion trajectory line MT which is along the circumference of a predetermined radius R centered on the optical axis O. The rotatably moving adjustment pin 525 urges the blade 550 outward and makes the blade 550 turn clockwise around the shaft pin 537. As a result, the diameter of the light passing hole 555 is increased. When the adjustment pin 525 is located at the first position P1, the diameter of the light passing hole 555 is reduced by performing the reverse movement.

The adjustment hole 552 has a first section S1 extending from the first position P1 and a second section S2 extending from the second position P2.

The first section S1 is a section in which the diameter of the light passing hole 555 changes in response to the rotational movement of the adjustment pin 525 in the adjustment hole 552. When the adjustment pin 525 is in the second section S2, the groove shape of the second section S2 overlaps with the motion trajectory line MT in the circumferential direction in which the adjustment pin 525 moves. Therefore, in the second section S2, even if the adjustment pin 525 in the adjustment hole 552 is rotatably moved, the diameter of the light passing hole 555 does not change.

In the present embodiment, the first section S1 has an intermediate section Sm that smoothly connects to the second section S2. Other section in the first section S1 and the intermediate section Sm are continuously connected so as to draw a smooth curve, and the intermediate section Sm and the second section S2 are continuously connected so as to draw a smooth curve.

Then, the position of the adjustment pin 525 when the touching portion 526*a* of the magnet holder 523*b* interlocking with the adjustment pin 525 in the adjustment hole 552 touches on the mechanical stopper MSA (refer to FIG. 4) is set to be in the second section S2. Thus, since the diameter of the light passing hole 555 does not change when the adjustment pin 525 is in the second section S2, there is variation in the position where the touching portion 526*a* abuts on the mechanical stopper MSA, and even if there is variation in the position of the adjustment pin 525 at that time, the variation in the diameter of the light passing hole 555 is small. Therefore, the variation in the minimum diameter of the aperture AP is also small. Further, since the magnet 521 is drawn toward the magnetic piece 517*a*, the adjustment pin 525 does not reverse after touching on the mechanical stopper MSA, and the diameter of the light passing hole 555 does not increase. On the other hand, the position where the movement restriction by the mechanical stopper MSB occurs is within the first section S1.

Figure 10:
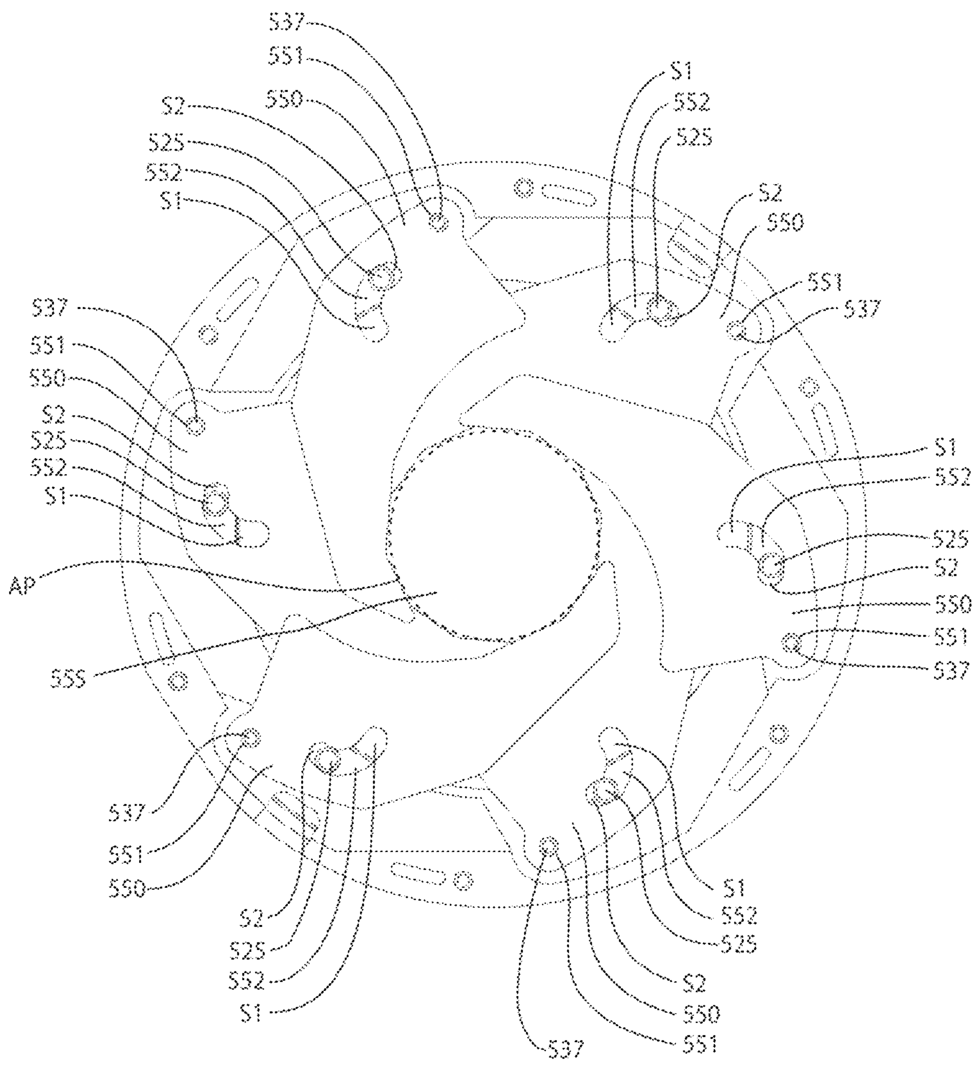
FIG. 10 is a plan view showing the blade 550 when the movable ring 520 touches on the mechanical stopper MSA.
Figure 11:
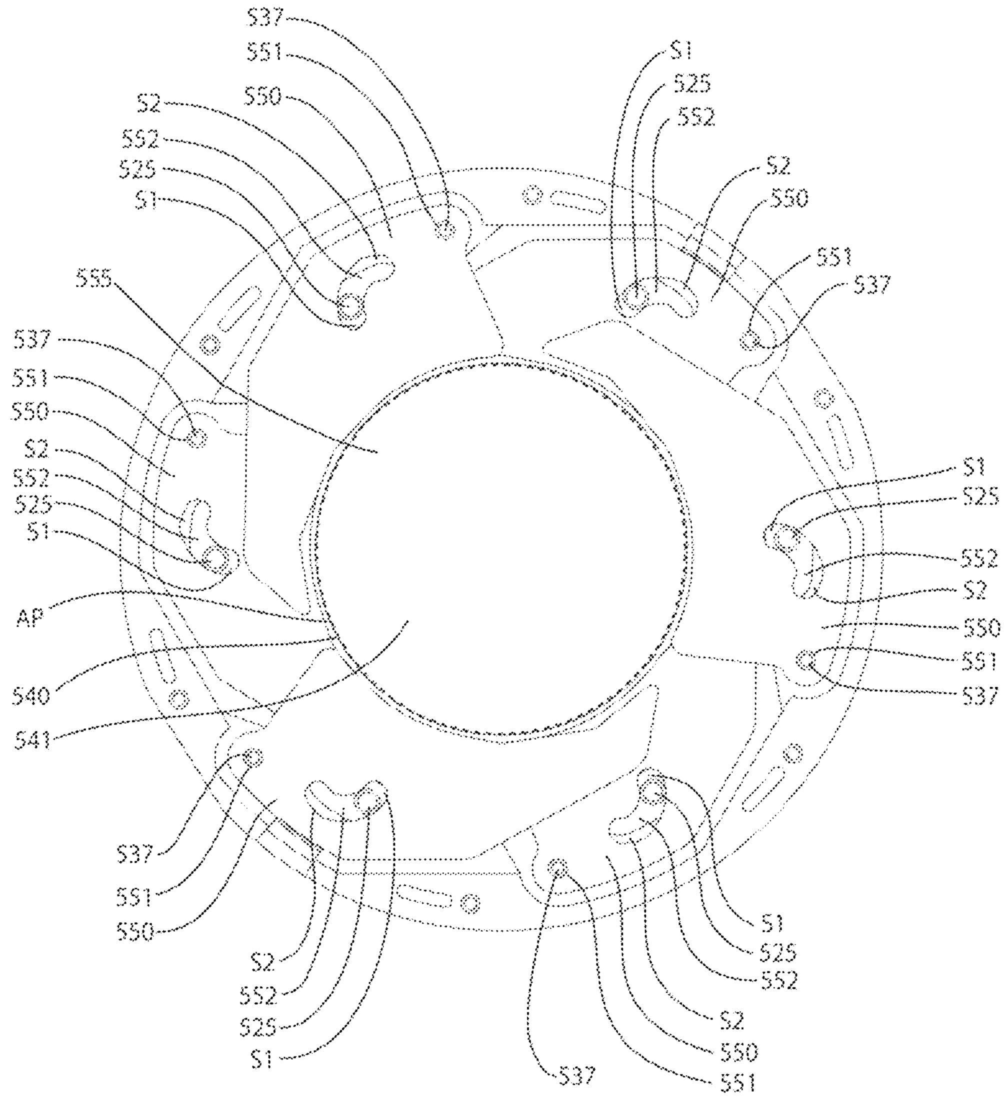
FIG. 11 is a plan view showing the blade 550 when the movable ring 520 touches on the mechanical stopper MSB.

As shown in FIG. 10, when the touching portion 526*a* of the magnet holder 523*b* of the movable ring 520 touches on the mechanical stopper MSA (refer to FIG. 4), the adjustment pin 525 is in the second section S2 of the adjustment hole 552. At this time, the diameter of the light passing hole 555 surrounded by the blades 550 is minimum, and the diameter of the aperture AP is also minimum. On the other hand, as shown in FIG. 11, when the touching portion 526*b* of the magnet holder 523*b* of the movable ring 520 touches on the mechanical stopper MSB (refer to FIG. 5), the adjustment pin 525 is in the first section S1 of the adjustment hole 552. At this time, the diameter of the light passing hole 555 surrounded by the blades 550 is maximum. However, since the diameter of the through hole 541 of the opening plate 540 is smaller than the diameter of the light passing hole 555, the diameter of the through hole 541 can function as the maximum diameter of the aperture AP.

Figure 12:
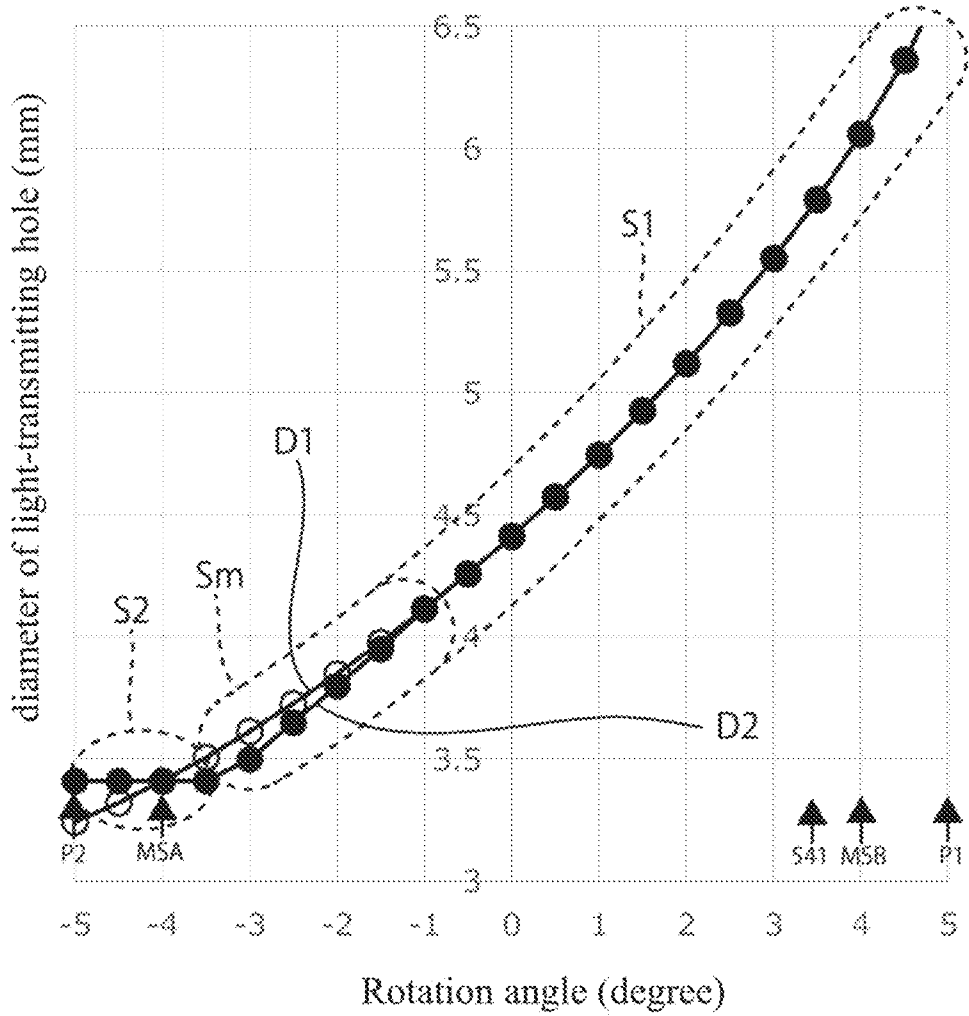
FIG. 12 is a diagram showing a relationship between a rotation angle of the movable ring 520 and a diameter of a light passing hole 555 in comparison with the prior art.

FIG. 12 shows a diameter D2 of the light passing hole 555 formed by the blades 550 with respect to the rotation angle of the movable ring 520 in the present embodiment, compared with a diameter D1 of the light passing hole formed by the blades in the prior art.

In the prior art, the diameter of the light passing hole changes in accordance with the rotation of the movable ring 520 in the vicinity of the position touching on the mechanical stopper MSA. Therefore, it is understandable that the problem of variation in the minimum diameter of the light passing hole occurs due to the variation of the position touching on the mechanical stopper MSA.

In contrast, according to the present embodiment, the adjustment hole 552 is provided with the second section S2 (a section of −3.5 to −5.0 degrees in FIG. 12) in which the diameter of the light passing hole 555 does not change by rotation of the movable ring 520, and the position touching on the mechanical stopper MSA is set in the second section S2 (a position of −4.0 degrees in the present embodiment). Therefore, it is possible to suppress variation in the minimum diameter of the light passing hole 555 that is, variation in the minimum diameter of the aperture AP, caused by variation in the position touching on the mechanical stopper MSA.

In the first section S1 excluding the intermediate section Sm, there is no difference between the prior art and the present embodiment. The diameter D2 of the light passing hole 555 is the same as the diameter of the through hole 541 of the opening plate 540 at +3.5 degrees, the first position P1 is set at +5.0 degrees, and the position touching on the mechanical stopper MSB is set at +4.0 degrees between them. Accordingly, the diameter of the through hole 541 of the opening plate 540 can be set to the maximum diameter of the aperture AP, and the maximum diameter of the aperture AP can be stabilized.

As described above, the blade driving device 5 according to the present embodiment has a first member, a second member, and six blades 550. The first member corresponds to the movable ring 520 and has six adjustment pins 525 provided on the circumference centered on the optical axis O of the lens body 7. The second member corresponds to a combination of the base 510 and the fixed ring 530, and has a shaft pin 537 of the fixed ring 530 provided in correspondence with the adjustment pin 525. The blade 550 has an adjustment hole 552 and a shaft hole 551, respectively. As shown in FIG. 9, the adjustment pin 525 is movably fitted into the adjustment hole 552. The shaft pin 537 is immovably fitted into the shaft hole 551. The blades 550 are turnable around the shaft pin 537 and form a light passing hole 555 through which light incident on the lens body 7 passes. The movable ring 520 and the combination of the base 510 and the fixed ring 530 are combined with each other, so that the movable ring 520 rotates relatively with respect to the combination of the base 510 and the fixed ring 530 around the optical axis O of the lens body 7. Furthermore, the base 510 has mechanical stoppers MSA and MSB that stop the rotation of the movable ring 520 by touching the movable ring 520 against the base 510. The adjustment hole 552 has a first section S1 extending from the first position P1 and a second section S2 extending from the second position P2. When the adjustment pin 525 is present in the second section S2, the adjustment hole 552 of the second section S2 extends along the motion trajectory line MT in which the adjustment pin 525 moves, the diameter of the light passing hole 555 is minimum, and at this time, the movable ring 520 and the base 510 touch on each other by the mechanical stopper MSA as shown in FIG. 4.

When the adjustment pin 525 is present in the second section S2, the adjustment hole 552 extends along the motion trajectory line MT in which the adjustment pin 525 moves. Thereby, since the blade 550 does not make a turning motion even if the adjustment pin 525 moves, the diameter of the light passing hole 555 does not change. If the movable ring 520 and the base 510 abut on each other at the mechanical stopper MSA in this second section S2, there is no difference in the turning state of the blade 550 even if there is variation in the position of the mechanical stopper MSA. Thus, even if there is a variation in the position of the mechanical stopper MSA, the variation in the minimum diameter of the light passing hole 555 formed by the blades 550 can be suppressed. Thus, according to the present embodiment, it is possible to reduce the variation in the minimum diameter of the aperture AP caused by the variation in the position of the mechanical stopper MSA.

It is to be noted that, in the above-described embodiment, when the shape of the first section S1 can be continuously connected to the second section S2 so as to draw a smooth curve, the intermediate section Sm may not be provided.

In addition, in the above-described embodiment, the shaft pin 537 inserted into the shaft hole 551 is fixed, and the adjustment pin 525 inserted into the adjustment hole 552 is rotated. However, the adjustment pin 525 inserted into the adjustment hole 552 may be fixed and the shaft pin 537 inserted into the shaft hole 551 may be rotated.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

EXPLANATION OF REFERENCE SYMBOLS

1: camera device; 5: blade driving device; 6: image sensor; 7: lens body; 7*a*: placing portion; 8: lens driving device; 9: smartphone; 10: housing; 11: front wall; 11*a*: through hole; 12: sidewall; 20: peripheral portion; 21: FPC; 21*a*: terminal portion; 22*a*, 22*b*: extension portion; 23*a*, 23*b*: erecting portion; 31*a*, 31*b*: coil; 32*a*, 32*b*: reinforcing plate; 40: frame body; 41: front side surface; 42: inner side surface; 43: outer side surface; 44: notched portion; 44*a*: groove; 45*a*, 45*b*: coil holder; 50: blade driving device main body; 510: base; 510*a*: base touching portion; 510*b*: base hook portion; 511: ball; 512*a*, 512*b*: ball receiving portion; 515*a*, 515*b*: holder accommodating portion; 517*a*, 517*b*: magnetic piece; 518*a*, 518*b*: magnetic piece holder; 520: movable ring; 520*a*: disk portion; 520*b*: through hole; 521: magnet; 522*a*, 522*b*: ball receiving portion; 523*a*, 523*b*: magnet holder; 525: adjustment pin; 526*a*, 526*b*: touching portion; 530: fixed ring; 530*a*: fixed ring touching portion; 530*b*: fixed ring hook portion; 530*c*: disk portion; 530*d*: outermost peripheral portion; 530*e*: central portion; 530*f*: innermost peripheral portion; 531: through hole; 535: slot; 536*a*, 536*b*: accommodating recessed portion; 537: shaft pin; 540: opening plate; 541: through hole; 550: blade; 551: shaft hole; 552: adjustment hole; 555: light passing hole; 560: cover; 561: through hole; AP: aperture; D1, D2: diameters of light passing holes; MSA, MSB: mechanical stopper; MT: motion trajectory line; O: optical axis; P1: first position; P2: second position; R: radius; S1: first section; S2: second section; Sm: intermediate section.

What is claimed is:

1. A blade driving device, comprising:

a first member comprising a plurality of adjustment pins positioned on a circumference centered on an optical axis of a lens body;

a second member comprising a plurality of shaft pins positioned in correspondence with the adjustment pins; and a plurality of blades, each of the blades comprising an adjustment hole in which one of the adjustment pin is movably fitted and a shaft hole in which one of the shaft pins is rotatably fixed, and being combined to form a light passing hole in the center thereof through which light incident on the lens body passes, wherein the first member and the second member are combined with each other so that one rotates relative to the other centered on the optical axis of the lens body, and the other has a mechanical stopper that stops the rotation of the one by making the one touch on the other;

the adjustment hole has a first section extending from a first position and a second section extending from a second position, when the adjustment pin is in the second section, the adjustment hole of the second section moves along a trajectory where the adjustment pin moves, a diameter of the light passing hole is minimum, and at this time, the first member and the second member touch on each other at the mechanical stopper.

2. The blade driving device according to claim 1, wherein:

a minimum diameter of an aperture that restricts passage of light incident on the lens body is a minimum diameter of the light passing hole formed by the blades.

3. The blade driving device according to claim 1, wherein:

when the adjustment pin is in the first section, the diameter of the light passing hole changes due to relative rotation of the first member and the second member, and the diameter of the light passing hole formed by the blades is maximum when the adjustment pin is at the first position.

4. The blade driving device according to claim 1, comprising a third member with an opening, wherein a diameter of the opening is a maximum diameter of an aperture that restricts passage of light incident on the lens body.

5. The blade driving device according to claim 4, wherein:

a maximum diameter of the light passing hole formed by the blades is larger than the diameter of the opening of the third member, which is the maximum diameter of the aperture.

6. The blade driving device according to claim 1, wherein: the first section has an intermediate section that smoothly connects to the second section.

7. The blade driving device according to claim 1, wherein: one of the first member and the second member has a magnet, the other has a magnetic member, and when the first member and the second member are touching on each other by the mechanical stopper, the magnet and the magnetic member face each other in a rotation direction.

8. The blade driving device according to claim 7, comprising a fourth member with a coil facing the magnet, wherein the magnet and the coil generate an electromagnetic force that relatively rotates the first member and the second member.

9. A camera device comprising the blade driving device according to claim 1.

10. An electronic apparatus comprising the camera device according to claim 9.

* * * * *